Sept. 25, 1951     R. FENNEMA ET AL     2,569,412
VALVE
Filed Feb. 3, 1945     2 Sheets-Sheet 1
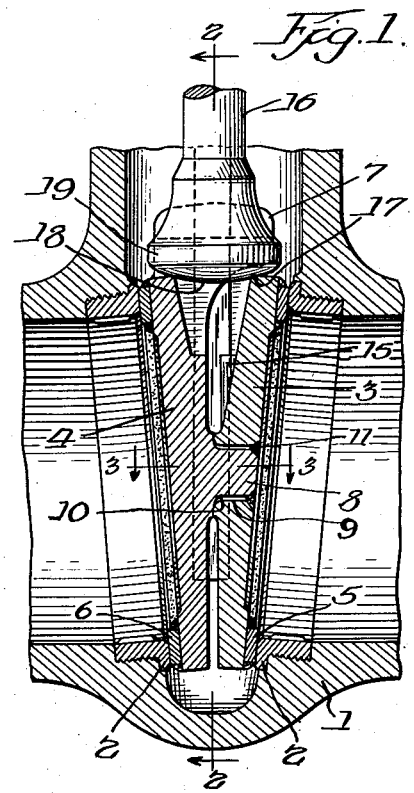
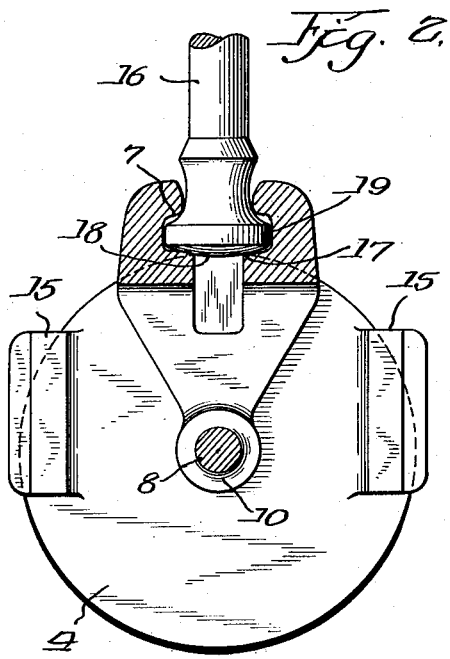
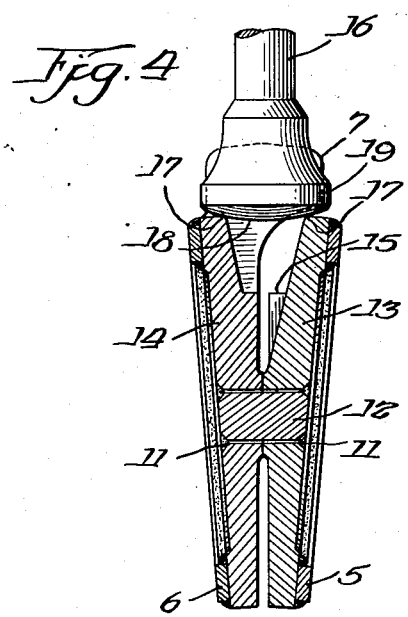
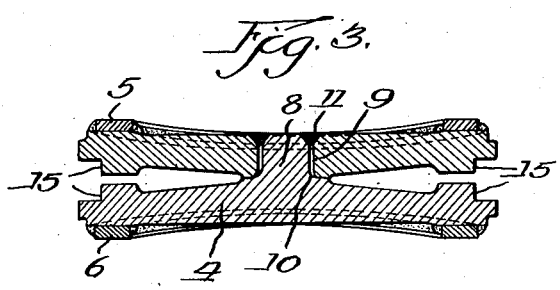
Inventors:
Richard Fennema, &
Francis J. Cantalupo
By: Joseph O. Lange, Atty.

Sept. 25, 1951 R. FENNEMA ET AL 2,569,412
VALVE
Filed Feb. 3, 1945 2 Sheets-Sheet 2

Inventors:
Richard Fennema &
Francis J. Cantalupo.
By Joseph O. Lange Atty.

Patented Sept. 25, 1951

2,569,412

UNITED STATES PATENT OFFICE 2,569,412

VALVE

Richard Fennema and Francis J. Cantalupo, Chicago, Ill., assignors to Crane Co., Chicago, Ill., a corporation of Illinois Application February 3, 1945, Serial No. 576,056

1 Claim. (Cl. 251—63)

This invention relates to valves and is an improvement over our patent application identified as Serial No. 502,062, filed September 11, 1943, now abandoned. More particularly, it pertains to a novel form of combined support and actuating means for elastic discs or closure members for use with gate valves or the like. Heretofore in gate valves the solid wedge type of valve closure member with a conventional tapered construction has been largely employed. However, the latter construction has been found unsatisfactory in many instances because of the inability of the actuating means, such as the valve stem, to adjust itself readily and easily to the flexing of the gate valve closure member when being seated. Accordingly in a number of cases, because of such failure to make suitable adjustment, there has resulted substantial leakage. In many cases, too, as a result of such inability of the combined stem and valve closure member to become adjusted accurately to the taper of the seat in the valve body, users who under emergency conditions may make their own repairs have been unable to effect the necessary valve seat tightness when substituting a new closure member for the old one being replaced. With the present invention there is afforded a greater opportunity to make such adjustment successfully. Also in numerous past instances it has been found in assembling a solid wedge closure member in a body made either as a forging or as a casting that there was not sufficient resiliency to allow for desirable seat tightness or else such closure member resiliency has occurred at objectionable, inconsistent locations within the casing to result in valve leakage.

It is therefore an important object of this invention to provide a novel gate valve closure member together with a stem actuating means as an effective substitute for the conventional solid wedge disc in which the objections referred to have been clearly overcome and which, in addition, provides a uniquely assembled structure, avoiding the usual foundry problems when making castings of this type.

In addition, the closure member embodying this invention is essentially of two-piece construction, assembled and preferably welded together from simple component parts to form a practical and economical device.

It is a further object to locate such weld in the novel two-piece construction in such position that the stresses imposed thereon are placed in shear rather than in tension, thus greatly enhancing the strength of the weld under the usual service conditions encountered.

It is a further important object of this invention to furnish a unique valve closure member in which the latter is designed to provide substantially uniform flexibility in all directions when seated within the casing, the lower portion of the actuating stem normally bearing simultaneously against both halves of the resilient closure member when the latter is being seated to thereby apply a uniform load upon each member.

It is also an object to provide a resilient or flexible closure member and stem actuating means which avoids objectionable sticking in the body when the closure member is seated at high temperatures and subsequently allowed to cool to atmospheric temperatures. In previous installations such sticking has occurred with the conventional solid wedge tapered closure member to render the operation thereof frequently difficult.

Other objects and advantages will become more readily apparent upon proceeding with the following specification read in accompaniment with the drawings, in which Fig. 1 is a sectional view of a closure member embodying our invention.

Fig. 2 is a sectional view of the closure member taken on the line 2—2 of Fig. 1.

Fig. 3 is a sectional view taken on the line 3—3 of Fig 1.

Fig. 4 is a modified form of closure member embodying our invention.

Similar reference numerals refer to similar parts throughout the several views.

Figure 5:
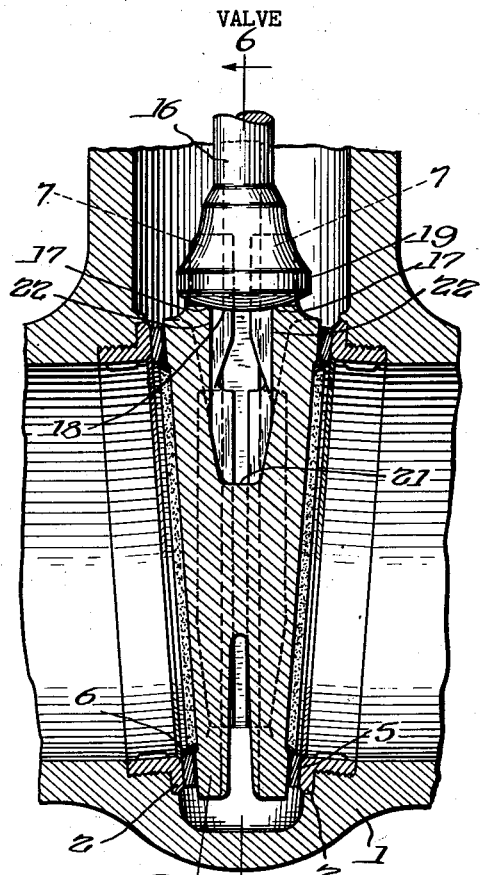
Fig. 5 is a fragmentary vertical sectional view of a modified form of our invention.
Figure 6:
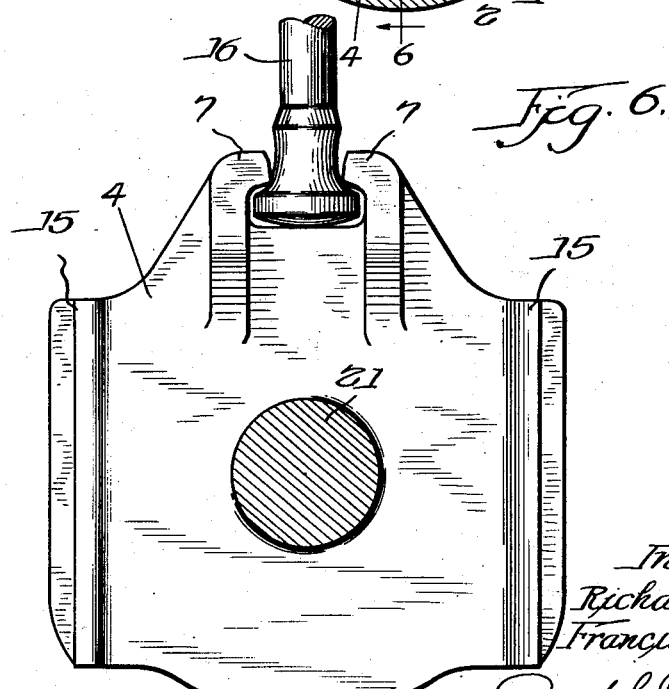
Fig. 6 is a sectional view of the closure member taken on the line 6—6 of Fig. 5.

Referring now to Fig. 1, the body or casing 1 fragmentarily shown is of the usual gate valve type having the conventional end portions (not shown) for connection to a pipe line and provided with the usual valve seats 2 upon which the tapered valve closure member makes suitable sealing contact when the valve is in its closed position as shown. The novel closure member embodying our invention consists essentially of two connected parts, namely, the smaller disc half portion 3 and the larger remaining half portion of the disc designated 4, each of which is provided with the conventional valve seating surfaces 5 and 6 respectively, for engagement with the abutting seating surfaces 2 of the casing. While in each case the closure member herein is shown as having separate seating or contact faces welded in position, it is obvious that the discs may be furnished with the seating surfaces integral. Similarly, the seating members 2 may be made integral rather than as separate rings as shown, if desired. It is preferable that the assembled discs should be of such construction as to lend themselves conveniently to a connection with the actuating means employed, such as a valve stem 16, the lower portion of which is shown. Obviously this may be accomplished by other than the T-head arrangement illustrated. The important element is that the actuating means employed should serve not only to hold the discs properly during actuation but also to support and spread the flexible discs during the seating operation. In the latter connection it will be noted that the larger disc half portion 4, as shown more clearly in Fig. 2, is provided at its upper limit with the cut-out extension 7 for suitable engagement with the head 19 of the valve stem. As an important element of this invention, the larger disc half is preferably provided at its central axis with a shank portion 8 fitting with suitable clearance within the aperture 9 of the closure member half 3. It is obvious that the shank 8 and the aperture 9 may be reversed in their relative positions on the respective disc halves. The shank 8 is preferably rounded at its lower portion as indicated at 10, thereby effecting a suitable bearing within the aperture. The smaller half portion 3 of the closure member is thus assembled in abutting contact with the remaining half 4 of the closure member. Accordingly the end portion of the shank 8 and also the annular surface portion of the closure member half 3 which surrounds the end of the shank is suitably formed to allow for the application of the annular weld designated 11. By the latter arrangement the weld is relieved of the stresses which are largely assumed by the shank 8 since the stress assumed by the weld is largely that of an annular hinge, permitting such deflection of each of the disc halves as may be available by the shank clearance within the aperture and the weld itself. It will further be apparent that by reason of the rounded contact, as at 10, adjacent the base of the shank, the discs relative to each other will be permitted substantial contact which also allows for adaptability to slight variations in the angle of the seat of the casing. This desirable result will be obtainable to a large degree because of the construction employed and irrespective of whether the material used is of a resilient character as, for example, in a forging, or in soft metal, or whether it is made in a casting. The weld serves thus as the flexible hinging element between the discs halves in joining them to form the complete closure and to seal against leakage therepast. It is obvious that the weld may be replaced by suitable solder, brazing or similiar fluid sealing connecting means if desired.

The reciprocably movable stem 16 at its lower head portion 19 is preferably rounded as at 18 to provide supporting means with slight spreading upon the discs 4 in its contact with the slightly rounded corner portions 17. This stem-disc arrangement has been found especially desirable in the resilient closure member construction in order to insure a tight fluid sealing contact with the seating members 2, particularly at the upper or larger end of the seat taper. Heretofore it has been found that because of a failure to provide for such combined support and spreading means, there was the objectionable tendency on the part of one or both discs to cant slightly inwardly, and this was true especially when heavy closing loads by the stem were required in an effort to make the valve seat tightly. In contrast, it will be apparent that by our present method of arranging the contact between the stem and the closure members 4, the higher the load applied by the stem in closing the valve the more support is given to the discs in bearing against their respective seats 2.

Referring now to the modified form of structure shown in Fig. 4, the arrangement is similar to that as described in connection with the other figures except that instead of employing the integral shank 8 a through pin 12 extends through both halves of the closure members 3 and 4, thereby allowing for a weld to be made at each end of the pin and preferably extending around the adjacent annular portion on each closure member half. It will be apparent that the pin 12 serves in substantially the same manner as the integral shank 8 described in connection with the other figures.

Referring now to the modified form of our invention shown in Fig. 5, the disc closure members 4 are shown integrally joined as at 21. However, as distinguished from the structure shown and described in connection with Figs. 1 to 4 inclusive in which the connection between the stem and closure member is made with but one of the discs, in the instant embodiment the hooked end 7 is provided on both disc halves 4, and the integrally formed wedge lugs 22 are provided with the preferably rounded corners 17, the latter cooperating with the rounded portion 18 of the stem in a manner similar to that described in connection with the construction shown in Figs. 1 to 4. However, it will be apparent that the stem 16 in Fig. 5 is engaged at 7 by both closure member halves 4, which may be particularly desirable especially in large valves in order to permit even lift or pull on both halves of the closure member during the valve opening operation. In other respects the support and spreading effect upon the closure member follows the teaching in Fig. 1. It should of course be obvious that the disc halves 4 may be joined in the manner described in earlier mentioned figures.

Accordingly it should be clear that our invention is capable of numerous changes within its scope. We desire therefore to be limited only to the extent of the claim appended hereto interpreted in the light of the prior art.

We claim:

In combination, a reciprocally movable wedge-shaped gate valve closure member, converging valve seats for the said closure member, actuating means for the closure member including a depending inverted T-head with its inner end limits defined by a wedging surface portion, the said closure member comprising a pair of discs peripherally spaced apart and being joined together in juxtaposed relation at a central portion thereof, at least one of said discs having oppositely disposed upwardly projecting means engageable with a rear surface portion of the said T-head for effecting the reciprocal movement of the said closure member and said discs having inner corner portions of the periphery thereof adjacent the base of the upwardly projecting means provided with inwardly and downwardly sloping wedge surfaces, the latter surfaces normally bearing against the said wedging surface of the T-head when the discs contact the said valve seats and upon slight continued movement of the T-head toward the discs a lateral force is initiated by the wedging surface portion of the T-head upon said disc wedging surfaces during substantially the final seating of the closure member, the said wedging force being laterally applied against each valve disc adjacent the inner peripheral corner portions thereof thereby to spread the discs slightly apart at such peripheral portion and to maintain the said discs in predetermined spaced-apart relation in the closed or seated position of the valve.

RICHARD FENNEMA.
FRANCIS J. CANTALUPO.

REFERENCES CITED

The following references are of record in the file of this patent:

UNITED STATES PATENTS

| Number | Name | Date |
|---|---|---|
| 60,932 | Peet | Jan. 1, 1867 |
| 88,934 | Wilson | Apr. 13, 1869 |
| 164,538 | Frisbie | June 15, 1875 |
| 236,780 | Coffin | Jan. 18, 1881 |
| 786,043 | Luckett | Mar. 28, 1905 |
| 838,842 | Castle | Dec. 18, 1906 |
| 1,624,465 | Black | Apr. 12, 1927 |
| 2,065,628 | Taylor | Dec. 29, 1936 |
| 2,075,123 | Lunken | Mar. 30, 1937 |
| 2,121,686 | Currie | June 21, 1938 |
| 2,193,922 | Hehemann | Mar. 19, 1940 |
| 2,282,553 | Banowetz | May 12, 1942 |
| 2,359,442 | Sandilands | Oct. 3, 1944 |
| 2,394,128 | Wennerby | Feb. 5, 1946 |

FOREIGN PATENTS

| Number | Country | Date |
|---|---|---|
| 158,360 | ~~Germany~~ Austria | Apr. 10, 1940 |